United States Patent
Cariello

(10) Patent No.: US 12,468,451 B2
(45) Date of Patent: Nov. 11, 2025

(54) SACRIFICIAL BLOCK POOL

(71) Applicant: Micron Technology, Inc., Boise, ID (US)

(72) Inventor: Giuseppe Cariello, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 144 days.

(21) Appl. No.: 17/652,234

(22) Filed: Feb. 23, 2022

(65) Prior Publication Data

US 2023/0205425 A1    Jun. 29, 2023

Related U.S. Application Data

(60) Provisional application No. 63/266,154, filed on Dec. 29, 2021.

(51) Int. Cl.
*G06F 3/06* (2006.01)

(52) U.S. Cl.
CPC .......... *G06F 3/0616* (2013.01); *G06F 3/064* (2013.01); *G06F 3/0647* (2013.01); *G06F 3/0679* (2013.01)

(58) Field of Classification Search
None
See application file for complete search history.

(56) References Cited

U.S. PATENT DOCUMENTS

2018/0341413 A1* 11/2018 Lai .................. G06F 3/0659

* cited by examiner

*Primary Examiner* — Michael Alsip
(74) *Attorney, Agent, or Firm* — Holland & Hart LLP

(57) ABSTRACT

Methods, systems, and devices for sacrificial block pool are described. For instance, a memory device may allocate a first pool of blocks and a second pool of blocks. The first pool of blocks may be associated with access operations in which each memory cell stores a single bit and the second pool of blocks may be associated with operations where each memory cell stores a single bit or multiple bits. The memory device may perform access operations according to the allocation, where for the access operations a first wear-leveling criteria is applied to a first subset of the second pool of blocks and a second wear-leveling criteria is applied to a second subset of the second pool of blocks. The memory device may move a block of the second subset to the first pool of blocks based on an amount of access operations associated with the block satisfying a threshold.

22 Claims, 7 Drawing Sheets

SACRIFICIAL BLOCK POOL

CROSS REFERENCE

The present application for patent claims the benefit of U.S. Provisional Patent Application No. 63/266,154 by CARIELLO, entitled "SACRIFICIAL BLOCK POOL," filed Dec. 29, 2021, assigned to the assignee hereof, and expressly incorporated by reference herein.

FIELD OF TECHNOLOGY

The following relates generally to one or more systems for memory and more specifically to sacrificial block pool.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
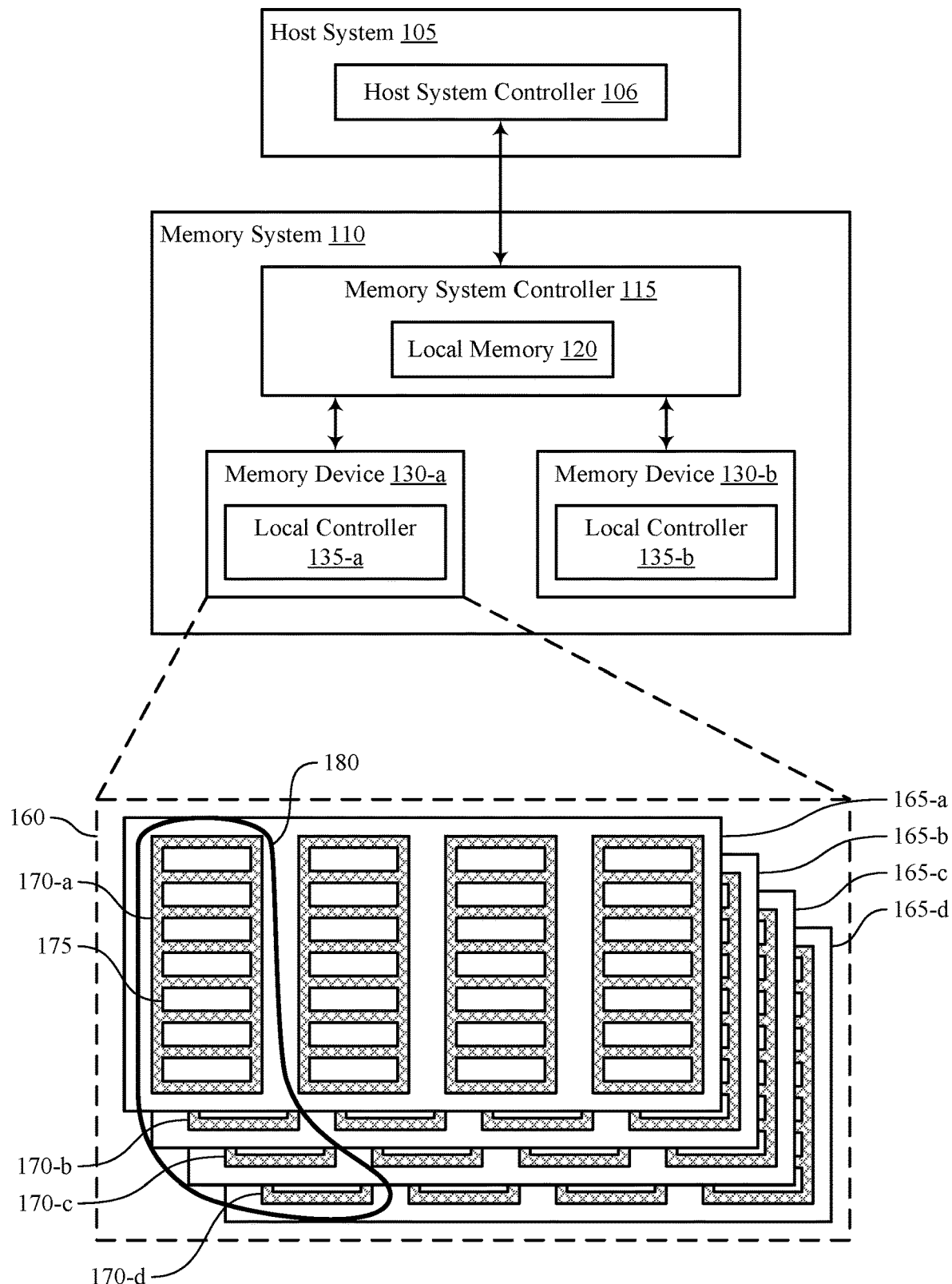
FIG. 1 illustrates an example of a system that supports a sacrificial block pool in accordance with examples as disclosed herein.

In some examples, a memory device may support access operations that store a single bit of information in a memory cell, referred to as single level cell (SLC) access operations. Additionally, the memory device may support access operations that store multiple bits of information in a memory cell, referred to as multi-level cell (MLC) (e.g., if storing two bits), triple-level cell (TLC) (e.g., if storing three bits), or quad-level cell (QLC) (e.g., if storing four bits) access operations. In some examples, the memory device may support different types of SLC access operations that provide different characteristics including programming time and cell wear out. For example, a first SLC access operation may use a lower program voltage and/or shorter programming time, and may have a smaller read window, while a second SLC access operation may use a higher program voltage and/or longer programming time, and may have a larger read window with a greater endurance. The first SLC access operation may be used on memory cells that may also be accessed using multi-bit (e.g., MLC, TLC, or QLC) access operations because the first SLC access operation may be compatible with the endurance constraints of multi-bit access operations. Thus, the memory device may include a first set of memory cells that are statically assigned for SLC access operations that use the second SLC access operation because the larger read window will maintain the endurance of the memory cells if used with SLC access operations. Such memory cells may correspond to a static pool of blocks. Additionally, the memory device may include a second set of memory cells that may be used in a dynamic manner between SLC access operations and multi-bit access operations by using the first SLC access operation. Such memory cells may correspond to a dynamic pool of blocks. The memory device may employ wear-leveling operations within each of the static pool and the dynamic pool. However, blocks within the dynamic pool may still have possible access operation cycles remaining within the static pool when considered to be at an end of life for use in the dynamic pool (e.g., where multi-bit access operations may be used and margin to the multi-bit read thresholds is not maintained).

The present disclosure describes methods that a memory device may perform to increase the lifespan of the memory device. For instance, the memory device may identify a first subset of the second pool of blocks (e.g., a sacrificial pool) and a second subset of the second pool of blocks. The memory device may adapt operations such as garbage collection and wear-leveling for the first subset of the second pool of blocks in ways that are associated with quicker wear-out than the second subset of the second pool. For instance, the memory device may write hot data (e.g., data received as a result of receiving a write command from a host device) to the first subset of the second pool of blocks and may write cold data (e.g., data being transferred from a first one or more memory cells of the memory device to a second one or more memory cells of the memory device, garbage collection) to the memory cells of the second subset of the second pool. Accordingly, the memory cells associated with the first subset of the second pool of blocks may wear out more quickly than memory cells of the second subset of the second pool of blocks. In examples in which an amount of access operations associated with at least one block of the first subset of the second pool of blocks satisfies a threshold, the memory device may move the at least one block from the first subset of the second pool of blocks to the first pool of blocks. Accordingly, the memory device may apply the second SLC access operation to memory cells associated with the at least one block after moving the at least one block to the first pool of blocks. By moving the at least one block to the first pool, memory cells of the second subset of the second pool may have a longer lifespan than if memory cells of the first subset of the second pool and the second subset of the second pool had a same wear leveling criteria. Accordingly, the lifespan of the memory device may increase.

Figure 2:
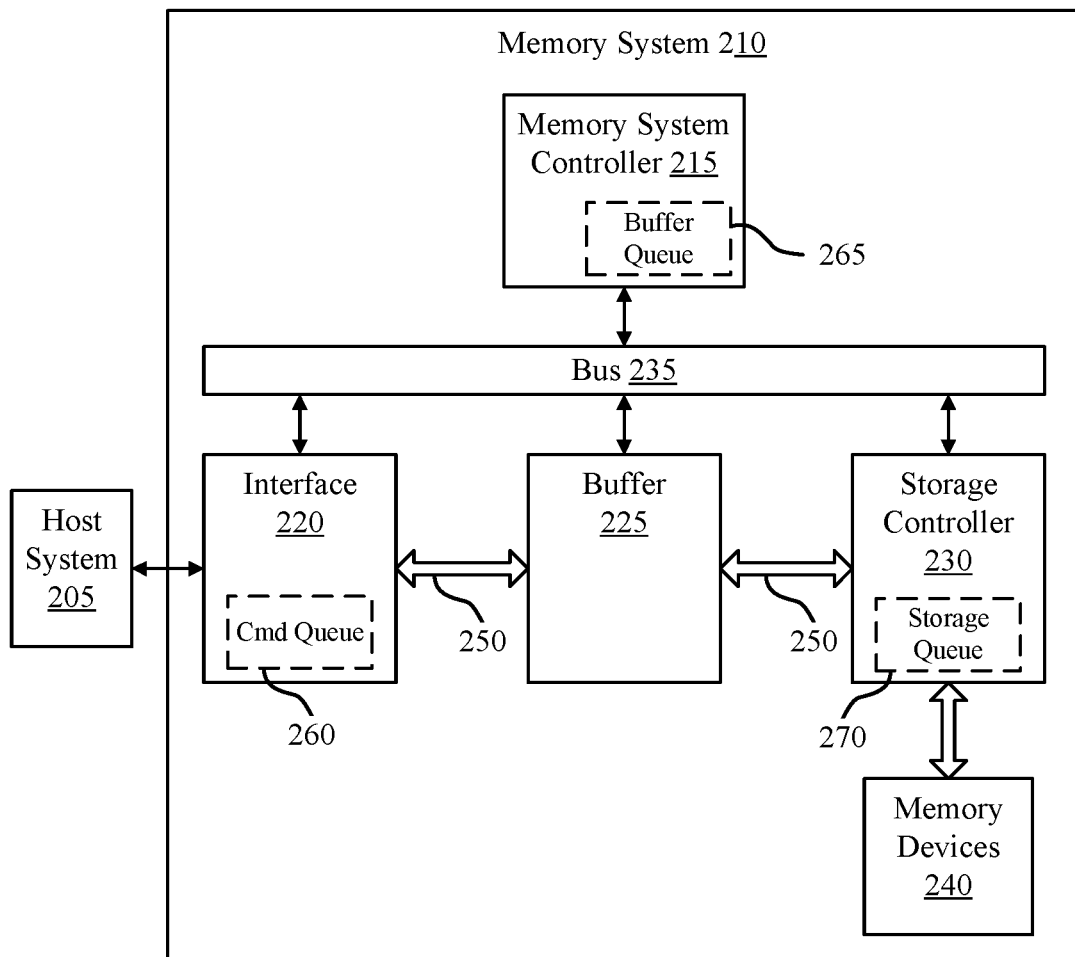
FIG. 2 illustrates an example of a system that supports a sacrificial block pool in accordance with examples as disclosed herein.

Features of the disclosure are initially described in the context of systems, devices, and circuits with reference to FIGS. 1 through 2. Features of the disclosure are described in the context of a reallocation scheme, cell distribution schemes, and a reallocation scheme with reference to FIGS. 3-5. These and other features of the disclosure are further illustrated by and described in the context of an apparatus diagram and flowchart that relate to sacrificial block pool with reference to FIGS. 6-7.

FIG. 1 illustrates an example of a system 100 that supports a sacrificial block pool in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-*a* may include a local controller 135-*a* and a memory device 130-*b* may include a local controller 135-*b*.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-*a*, 170-*b*, 170-*c*, and 170-*d* that are within planes 165-*a*, 165-*b*, 165-*c*, and 165-*d*, respectively, and blocks 170-*a*, 170-*b*, 170-*c*, and 170-*d* may be collectively referred to as a virtual block 180. In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for each page 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may include any quantity of non-transitory computer readable media that support a sacrificial block pool. For example, the host system 105, the memory system controller 115, or a memory device 130 (e.g., a local controller 135) may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is an MNAND system.

In some examples, a memory system 110 and/or a memory device 130-a may support access operations that store a single bit of information in a memory cell, referred to as SLC access operations. Additionally, the memory system 110 and/or the memory device 130-a may support access operations that store multiple bits of information in a memory cell, referred to as MLC (e.g., if storing two bits), TLC (e.g., if storing three bits), or QLC (e.g., if storing four bits) access operations. In some examples, the memory system 110 and/or the memory device 130-a may support different types of SLC access operations that provide different characteristics including programming time and cell wear out. For example, a first SLC access operation may use a lower program voltage and longer programming time, and may have a smaller read window, while a second SLC access operation may use a higher program voltage and shorter programming time, and may have a larger read window. The first SLC access operation may be used on memory cells that may also be accessed using multi-bit (e.g., MLC, TLC, or QLC) access operations because the first SLC access operation may have a reduced impact on the voltage distribution of programmed memory cells. Thus, the memory system 110 and/or the memory device 130-a may include a first set of memory cells that are statically assigned for SLC access operations that use the second SLC access operation because the larger read window will maintain the endurance of the memory cells if used with SLC access operations. Such memory cells may correspond to a static pool of blocks. Additionally, the memory system 110 and/or the memory device 130-a may include a second set of memory cells that may be used in a dynamic manner between SLC access operations and multi-bit access operations by using the first SLC access operation. Such memory cells may correspond to a dynamic pool of blocks. The memory system 110 and/or the memory device 130-a may employ wear-leveling operations within each of the static pool and the dynamic pool. However, blocks within the dynamic pool may still have possible access operation cycles remaining when considered to be at an end of life for use in the dynamic pool (e.g., where multi-bit access operations may be used and margin to the multi-bit read thresholds is not maintained).

The present disclosure describes methods that a memory system 110 and/or the memory device 130-a may perform to increase the lifespan of the memory system 110 and/or the memory device 130-a. For instance, the memory system 110 and/or the memory device 130-a may identify a first subset of the second pool of blocks (e.g., a sacrificial pool) and a second subset of the second pool of blocks. The memory system 110 and/or the memory device 130-a may adapt operations such as garbage collection and wear-leveling for the first subset of the second pool of blocks in ways that are associated with quicker wear-out than the second subset of the second pool. For instance, the memory system 110 and/or the memory device 130-a may write hot data (e.g., data received as a result of receiving a write command from a host device) to the first subset of the second pool of blocks and may write cold data (e.g., data being transferred from a first one or more memory cells of the memory system 110 and/or the memory device 130-a to a second one or more memory cells of the memory system 110 and/or the memory device 130-a, garbage collection) to the memory cells of the second subset of the second pool. Accordingly, the memory cells associated with the first subset of the second pool of blocks may wear out more quickly than memory cells of the second subset of the second pool of blocks. In examples in which an amount of access operations associated with at least one block of the first subset of the second pool of blocks satisfies a threshold, the memory system 110 and/or the memory device 130-a may move the at least one block from the first subset of the second pool of blocks to the first pool of blocks. Accordingly, the memory system 110 and/or the memory device 130-a may apply the second SLC access operation to memory cells associated with the at least one block after moving the at least one block to the first pool of blocks. By moving the at least one block to the first pool, memory cells of the second subset of the second pool may have a longer lifespan than if memory cells of the first subset of the second pool and the second subset of the second pool had a same wear leveling criteria. Accordingly, the lifespan of the memory system 110 and/or the memory device 130-a may increase.

FIG. 2 illustrates an example of a system 200 that supports a sacrificial block pool in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point, other chalcogenide-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240, e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation).

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210. Upon receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine that an access command has been received based on (e.g., in response to) the communication from the interface 220. In some cases, the memory system controller 215 may determine the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine if the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, garbage collection, and the like). The entries may be added to the storage queue 270, e.g., by the memory system controller 215. The entries may be removed from the storage queue 270, e.g., by the storage controller 230 or memory system controller 215 upon completion of the transfer of the data.

To process a read command received from the host system 205, the memory system controller 215 may again first determine if the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed above with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, that the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMMC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed above. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the above operations in conjunction with or instead of the memory system controller 215. In some cases, the memory system controller 215 may perform the functions of the storage controller 230 and the storage controller 230 may be omitted.

In some examples, a memory system 210 and/or a memory device 240 may support access operations that store a single bit of information in a memory cell, referred to as SLC access operations. Additionally, the memory system 210 and/or the memory device 240 may support access operations that store multiple bits of information in a memory cell, referred to as MLC (e.g., if storing two bits), TLC (e.g., if storing three bits), or QLC (e.g., if storing four bits) access operations. In some examples, the memory system 210 and/or the memory device 240 may support different types of SLC access operations that provide different characteristics including programming time and cell wear out. For example, a first SLC access operation may use a lower program voltage and longer programming time, and may have a smaller read window, while a second SLC access operation may use a higher program voltage and shorter programming time, and may have a larger read window. The first SLC access operation may be used on memory cells that may also be accessed using multi-bit (e.g., MLC, TLC, or QLC) access operations because the first SLC access operation may have a reduced impact on the voltage distribution of programmed memory cells. Thus, the memory system 210 and/or the memory device 240 may include a first set of memory cells that are statically assigned for SLC access operations that use the second SLC access operation because the larger read window will maintain the endurance of the memory cells if used with SLC access operations. Such memory cells may correspond to a static pool of blocks. Additionally, the memory system 210 and/or the memory device 240 may include a second set of memory cells that may be used in a dynamic manner between SLC access operations and multi-bit access operations by using the first SLC access operation. Such memory cells may correspond to a dynamic pool of blocks. The memory system 210 and/or the memory device 240 may employ wear-leveling operations within each of the static pool and the dynamic pool. However, blocks within the dynamic pool may still have possible access operation cycles remaining when considered to be at an end of life for use in the dynamic pool (e.g., where multi-bit access operations may be used and margin to the multi-bit read thresholds is not maintained).

The present disclosure describes methods that the memory system 210 and/or the memory device 240 may perform to increase the lifespan of the memory system 210 and/or the memory device 240. For instance, the memory system 210 and/or the memory device 240 may identify a first subset of the second pool of blocks (e.g., a sacrificial pool) and a second subset of the second pool of blocks. The memory system 210 and/or the memory device 240 may adapt operations such as garbage collection and wear-leveling for the first subset of the second pool of blocks in ways that are associated with quicker wear-out than the second subset of the second pool. For instance, the memory system 210 and/or the memory device 240 may write hot data (e.g., data received as a result of receiving a write command from a host device) to the first subset of the second pool of blocks and may write cold data (e.g., data being transferred from a first one or more memory cells of the memory system 210 and/or the memory device 240 to a second one or more memory cells of the memory system 210 and/or the memory device 240, garbage collection) to the memory cells of the second subset of the second pool. Accordingly, the memory cells associated with the first subset of the second pool of blocks may wear out more quickly than memory cells of the second subset of the second pool of blocks. In examples in which an amount of access operations associated with at least one block of the first subset of the second pool of blocks satisfies a threshold, the memory system 210 and/or the memory device 240 may move the at least one block from the first subset of the second pool of blocks to the first pool of blocks. Accordingly, the memory system 210 and/or the memory device 240 may apply the second SLC access operation to memory cells associated with the at least one block after moving the at least one block to the first pool of blocks. By moving the at least one block to the first pool, memory cells of the second subset of the second pool may have a longer lifespan than if memory cells of the first subset of the second pool and the second subset of the second pool had a same wear leveling criteria. Accordingly, the lifespan of the memory system 210 and/or the memory device 240 may increase.

Figure 3:
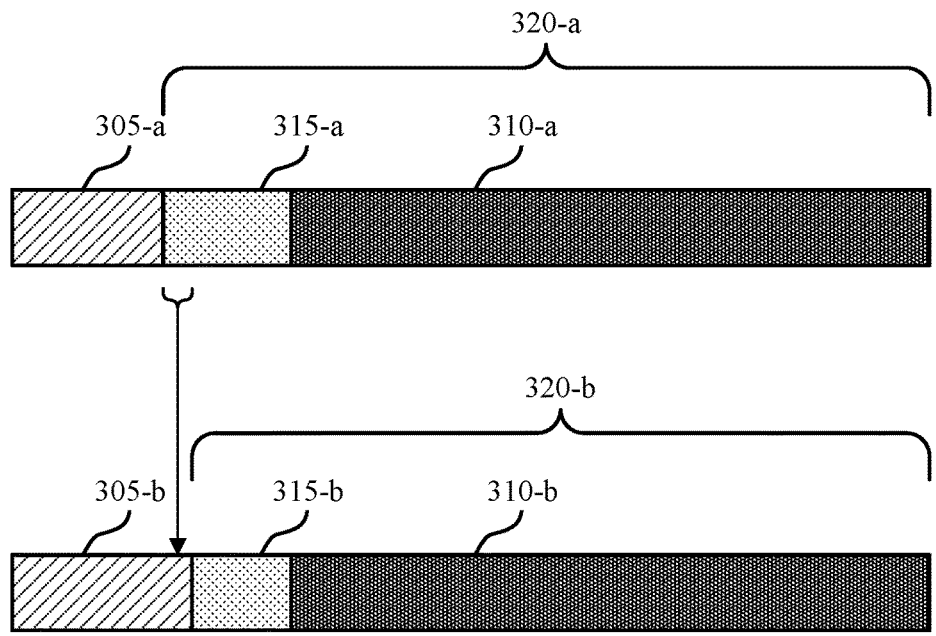
FIG. 3 illustrates an example of a reallocation scheme that supports a sacrificial block pool in accordance with examples as disclosed herein.
Figure 3:
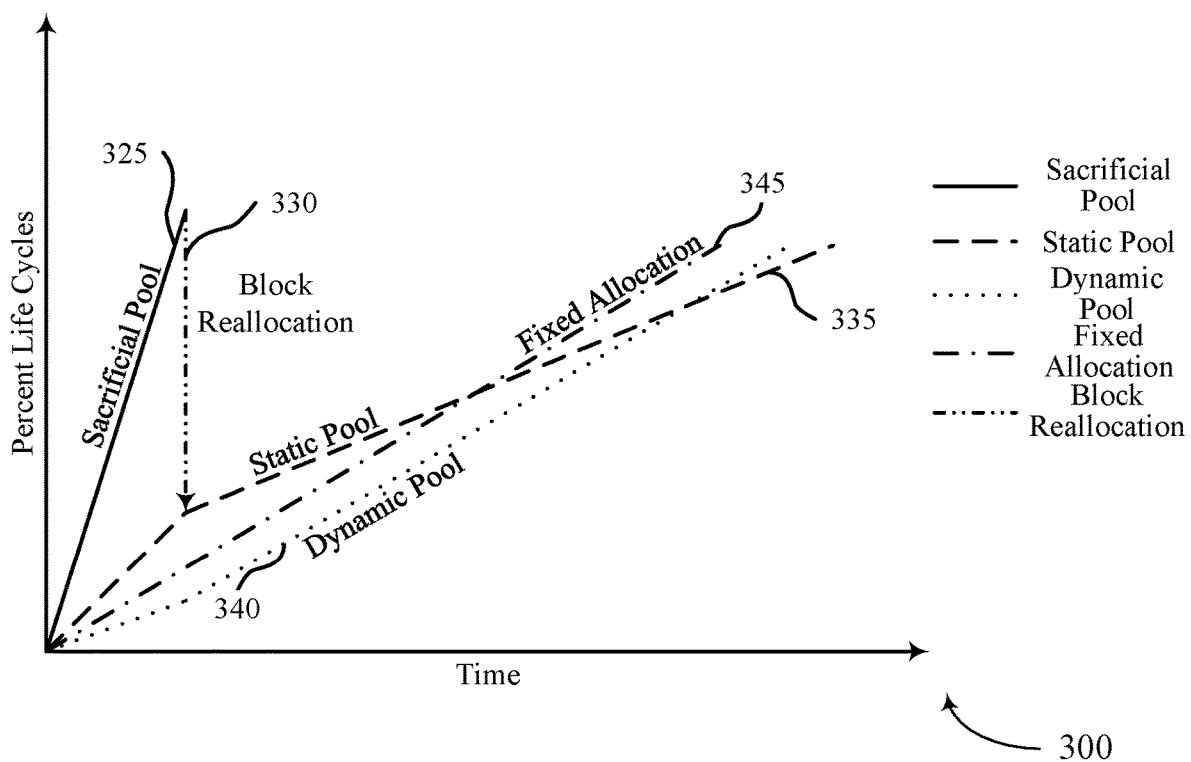

FIG. 3 illustrates an example of a reallocation scheme 300 that supports a sacrificial block pool in accordance with examples as disclosed herein. In some examples, the methods described herein may be applied to any memory device with memory cells assignable for single-bit access operations (SLC access operations) or multi-bit access operations (e.g., MLC access operations, TLC access operations, QLC access operations). For instance, the methods described herein may be applied to a NAND memory device or a flash memory device.

In some examples, a memory device may support access operations that store a single bit of information in a memory cell, referred to as SLC access operations. Additionally, the memory device may support access operations that store multiple bits of information in a memory cell, referred to as MLC (e.g., if storing two bits), TLC (e.g., if storing three bits), or QLC (e.g., if storing 4 bits) access operations. For example, a first SLC access operation may use a lower program voltage and/or shorter programming time, and may have a smaller read window, while a second SLC access operation may use a higher program voltage and/or longer programming time, and may have a larger read window. The first SLC access operation may be used on memory cells that may also be accessed using multi-bit (e.g., MLC, TLC, or QLC) access operations in a mixed or a dynamic usage (e.g., in a usage that supports SLC access operations and multi-bit access operations). Thus, the memory device may include a first set of memory cells that are statically assigned for SLC access operations that use the second SLC access operation because the larger read window will maintain the endurance of the memory cells if used with SLC access operations. Such memory cells may correspond to a static pool of blocks. Additionally, the memory device may include a second set of memory cells that may be used in a dynamic manner between SLC access operations and multi-bit access operations by using the first SLC access operation. Such memory cells may correspond to a dynamic pool of blocks.

In some examples, an access operation may be performed by applying a first set of pulses to memory cells of the static pool, where the first set of pulses may be associated with a greater degree of wear out than a second set of pulses applied to memory cells of the dynamic pool as part of multi-bit access operations. Using the first set of pulses may be associated with extra endurance (e.g., a higher quantity of supported erase cycles) based on (e.g., due to) the first set of pulses being associated with a higher read window than the second set of pulses. In order to achieve a less asymmetric (e.g., one-to-one) wear ratio between the memory cells of the static pool and the memory cells of the dynamic pool and to maintain mixed pool endurance, a third set of pulses used for SLC access operations on memory cells of the dynamic pool may use lower voltages (e.g., read voltages, program voltages) as compared to SLC access operations for the static pool (e.g., the first set of pulses). Accordingly, memory cells of the dynamic pool may still have SLC read-window budget (RWB) in examples in which the memory cells are reaching end-of-life (EOL) in the dynamic pool. Techniques that enable memory cells of the dynamic pool to be used to store data in which EOL is being reached in the dynamic pool may increase a lifespan of the memory device that includes the memory cells.

The present disclosure may describe methods that may enable a memory device to use memory cells of the dynamic pool after reaching EOL in the dynamic pool, which may increase a lifespan of the memory device. For instance, the memory device may create a sub-pool of dynamic blocks with accelerated wear out (e.g., with exceptions in a wear leveling algorithm and associated with storing hot data) referred to as a sacrificial pool, where the blocks of the sacrificial pool may be referred to as sacrificial blocks. In examples in which memory cells associated with blocks of the sacrificial pool reach EOL as multi-bit memory cells, the memory device may move the sacrificial blocks to the static pool (e.g., the memory device may statically assign the memory cells associated with the sacrificial blocks for SLC access operations and may apply the first set of pulses to the memory cells).

For instance, a memory device may allocate, from a set of blocks of the memory device, a static pool 305-*a* and a dynamic pool 320-*a*. In some such examples, the static pool 305-*a* may be associated with a first category of access operations in which each memory cell stores a single bit of information (e.g., SLC access operations) and the second pool of blocks may be associated with the first category of access operations (e.g., SLC access operations) or a second category of access operations in which each memory cell stores multiple bits of information (e.g., MLC, TLC, QLC access operations). In some examples, dynamic pool 320-*a* may include a first subset referred to as a sacrificial pool 315-*a* and a second subset referred to dynamic sub-pool 310-*a*. The memory device may perform a first set of access operations according to the allocation, where for the first set of access operations a first wear-leveling criteria is applied to sacrificial pool 315-*a* and a second wear-leveling criteria is applied to dynamic sub-pool 310-*a*. For instance, the first wear-leveling criteria may indicate that blocks of sacrificial pool 315-*a* are not to undergo wear-leveling whereas second wear-leveling criteria may indicate that blocks of dynamic sub-pool 310-*a* are to undergo wear-leveling.

In some examples, the memory device may move at least one block from a sacrificial pool to a static pool. For instance, moving a block from sacrificial pool 315-*a* to static pool 305-*a* may result in static pool 305-*b* and sacrificial pool 315-*b*, where static pool 305-*b* is increased in size relative to static pool 305-*a* and sacrificial pool 315-*b* is decreased in size relative to sacrificial pool 315-*a*. Additionally, dynamic pool 320-*b* may decrease in size (e.g., by a same amount as sacrificial pool 315-*b*) and dynamic sub-pool 310-*b* may be a same size as dynamic sub-pool 310-*a*.

In some examples, blocks of sacrificial pool 315-*a* may wear out faster than blocks of static pool 305-*a* and dynamic sub-pool 310-*a*. For instance, curve 325 may represent a percentage of life cycles experienced by a sacrificial pool over a duration of time, curve 335 may represent a percentage of life cycles experienced by a static pool over the duration of time, and curve 340 may represent a percentage of life cycles experienced by a dynamic sub-pool (e.g., dynamic sub-pool 310-*a* or 310-*b*) over the duration of time. Initially, sacrificial pool curve 325 may increase at a faster rate than static pool curve 335, and static pool curve 335 may increase at a faster rate than dynamic pool curve 340. At 330, blocks of the sacrificial pool may be reallocated to the static pool. As the static pool includes a greater quantity of blocks after 330, the rate of static pool curve 335 may decrease. Similarly, the dynamic pool may include a lesser quantity of blocks after 330, so blocks of the dynamic sub-pool may be accessed more frequently. Accordingly, a wear rate of dynamic pool curve 340 may increase after 330. In some examples, a curve 345 corresponding to a fixed allocation (e.g., an allocation including a static pool and a dynamic pool, but not a sacrificial pool) may reach a higher percentage of life cycles before static pool curve 335 and dynamic pool curve 340 do. Accordingly, the lifespan of the memory device may increase for memory devices using a sacrificial pool as compared to memory devices using a fixed allocation. In some examples, blocks of the sub-pool may experience a larger over-provisioning (OP), a lower write amplification factor (WAF), and a greater degree of asymmetric wear-out relative to blocks of a dynamic pool for a fixed allocation. Additionally, in examples in which moving sacrificial blocks to a static pool occurs, the moved block may have additional endurance for static pool operations. Accordingly, the memory device may experience a greater total bytes written (TBW) or terabytes written. The lower WAF may occur due to sacrificial blocks being used to store hot data (e.g., direct host writes), whereas blocks of the sub-pool may be used for storing cold data (e.g., internal data transfers, a maintenance operation such as garbage collection).

Figure 4A:
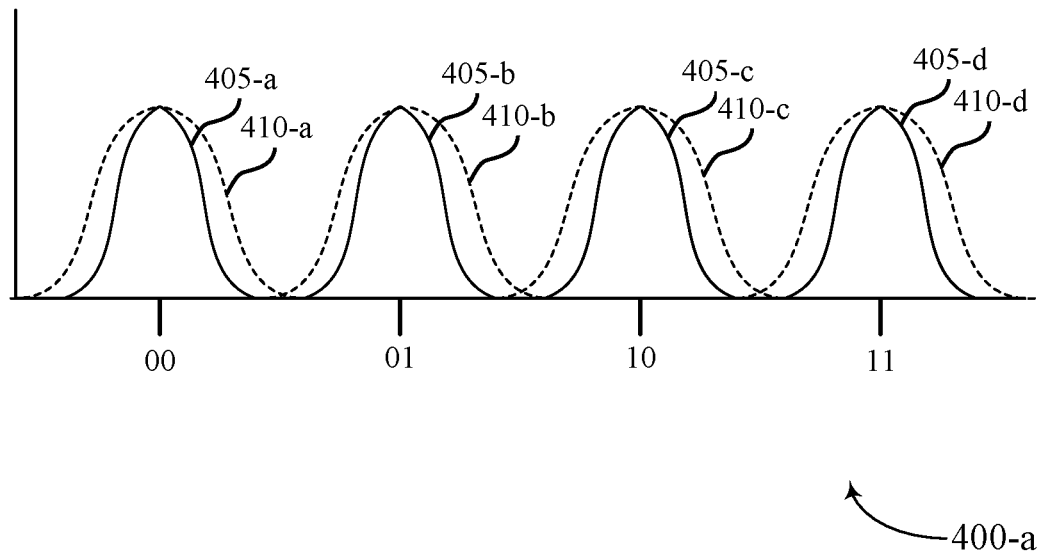
FIGS. 4A and 4B illustrate examples of cell distribution schemes that supports a sacrificial block pool in accordance with examples as disclosed herein.
Figure 4B:
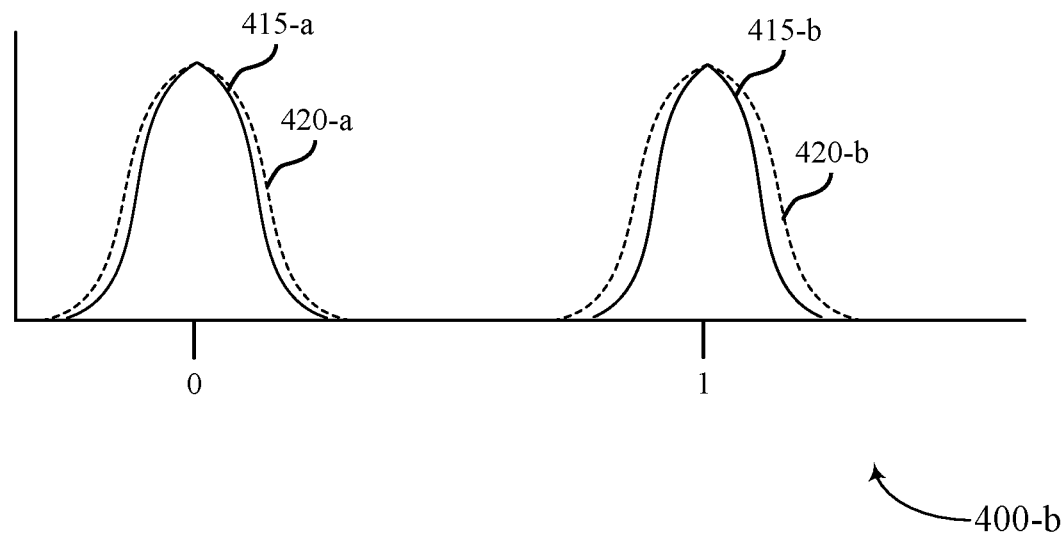

FIGS. 4A and 4B illustrate examples of cell distribution schemes 400-a and 400-b that support a sacrificial block pool in accordance with examples as disclosed herein. For instance, FIG. 4A may represent a cell distribution scheme 400-a of a set of memory cells associated with a sacrificial block before being moved to the static pool and FIG. 4B may represent a cell distribution scheme 400-b associated with the set of memory cells of the sacrificial block after being moved to the static pool. For instance, at an initial time, cell distributions 405-a, 405-b, 405-c, and 405-d may correspond to memory cells storing different bit values and may not overlap (e.g., the read window between distributions may have a non-zero positive value). However, as time progresses, cell distributions 405-a, 405-b, 405-c, and 405-d may degrade into cell distributions 410-a, 410-b, 410-c, and 410-d, respectively, where cell distributions 410-a, 410-b, 410-c, and 410-d may become closer to each other or overlap with each other (e.g., the read window may have a zero value or a negative value). Accordingly, the block associated with the reduced read windows may be moved to the static pool. At the initial time, if the set of memory cells were assigned for SLC access operations, the memory cell may have cell distributions 415-a and 415-b. However, after being moved to the static pool, the set of memory cells may have cell distributions 420-a and 420-b. Although cell distributions 410-a, 410-b, 410-c, and 410-d overlap with each other, cell distributions 420-a and 420-b may not overlap with each other for a same level of wear. Accordingly, memory cells moved to the static pool from the sacrificial pool may still be accessed when statically assigned for SLC access operations (e.g., using access operations having the first set of pulses).

Figure 5:
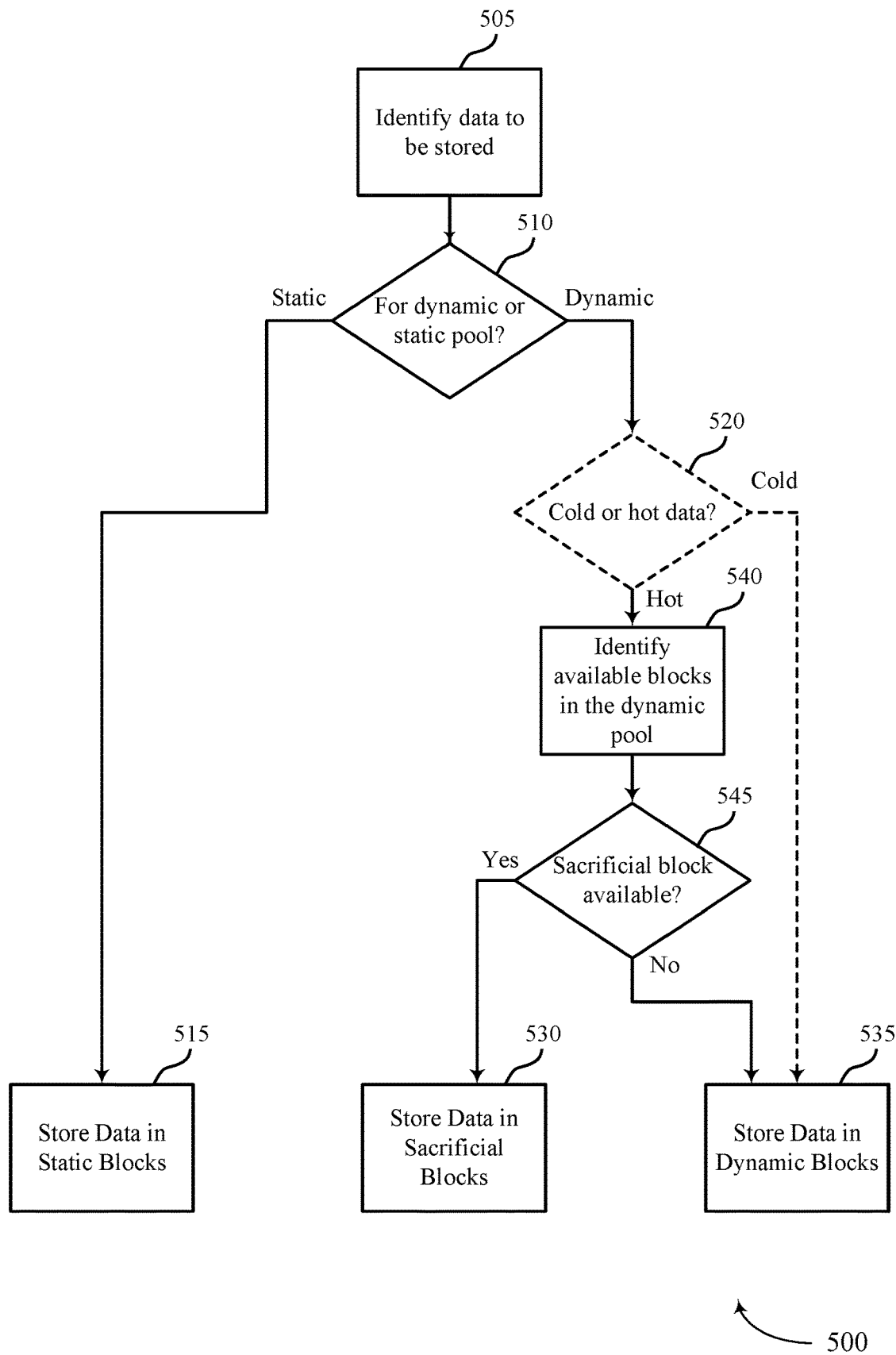
FIG. 5 illustrates an example of an access operation decision flow that supports a sacrificial block pool in accordance with examples as disclosed herein.

FIG. 5 illustrates an example of an access operation decision flow 500 that supports a sacrificial block pool in accordance with examples as disclosed herein. In some examples, the methods described herein may be applied to any memory device with a first set of memory cells configurable to store more than one bit of information at each memory cell of the first set and a second set of memory cells configurable to store a single bit of information at each memory cell of the second set. For instance, the methods described herein may be applied to a NAND memory device (e.g., a flash memory device), or any other type of memory device supporting different bit levels for memory storage or different types of access operations for supporting different wear or timing characteristics. Aspects of the access operation decision flow 500 may be implemented by a controller, among other components. Additionally or alternatively, aspects of the access operation decision flow 500 may be implemented as instructions stored in memory (e.g., firmware stored in a memory coupled with a controller. For example, the instructions, in examples in which the instructions are executed by a controller (e.g., a memory system controller 115 or a local controller 135-a), may cause the controller to perform the operations of the access operation decision flow 500.

At 505, data to be stored at the memory device may be determined. For instance, the memory device may identify data to be stored. At 510, whether data is to be stored in a static pool or a dynamic pool may be determined. For instance, the memory device may determine whether the data is to be stored in a static pool or a dynamic pool. Data that is associated with certain operations (e.g., data stored in a logical block address to physical block address (L2P) table) may be stored in the static pool. Data that is associated with other operations (e.g., incoming data, data identified as part of performing a garbage collection or folding operation) may be stored in the dynamic pool. If the memory device determines that the data is to be stored in the static pool, the memory device may proceed to 515. At 515, the data may be stored in a static block of the static pool. However, if the memory determines that the data is to be stored in the dynamic pool, the memory device may proceed to 520.

At 520, whether cold data or hot data is to be stored may be determined. For instance, the memory device may determine whether the memory device is storing cold data (e.g., data being transferred from a first set of memory cells to a second set of memory cells or a maintenance operation such as garbage collection) or hot data (e.g., data received from a host device). If storing cold data, the memory device may proceed to 535. At 535, cold data may be stored in a dynamic block of a dynamic pool. For instance, the memory device may store the cold data in a dynamic block of the dynamic pool (e.g., a dynamic block of a sub-pool of the dynamic pool that excludes the sacrificial pool). However, if storing hot data, the memory device may proceed to 540. Alternatively, the memory device may proceed to 540 from 510 regardless of whether the data is hot data or cold data.

At 540, available block in the dynamic pool may be identified. For instance, the memory device may identify available blocks in the dynamic pool (e.g., including the sacrificial pool). At 545, whether a sacrificial block is included in the available blocks may be determined. For instance, the memory device may determine whether a sacrificial block is included in the available blocks. For instance, the memory device may iterate through the available blocks to locate a sacrificial block. If a sacrificial block is available (e.g., if the memory device locates a sacrificial block), the memory device may proceed to 530. However, if a sacrificial block is not available (e.g., if the memory device fails to locate a sacrificial block, for instance, due to each sacrificial block being moved to the static pool, each sacrificial block already storing valid data, at least some of the addresses within each sacrificial block storing valid data), the memory device may proceed to 535. At 530, the memory device may store the data in the located sacrificial block. At 535, the data may be stored in a dynamic block the dynamic pool. For instance, the memory device may store the data in a dynamic block of the dynamic pool (e.g., the last block checked at 545). In some examples, the available blocks may be included in a list sorted from a previous version of the list. In some examples, the memory device may skip wear leveling for sacrificial blocks. For instance, in examples in which performing a static wear level check occurs, the memory device may skip sacrificial blocks and calculate a maximum erase cycle delta (e.g., a maximum change in erase cycles) for blocks of the dynamic pool excluding the sacrificial pool. Each erase cycle for a memory cycle may correspond to one iteration for which data is written at the memory cell.

Figure 6:
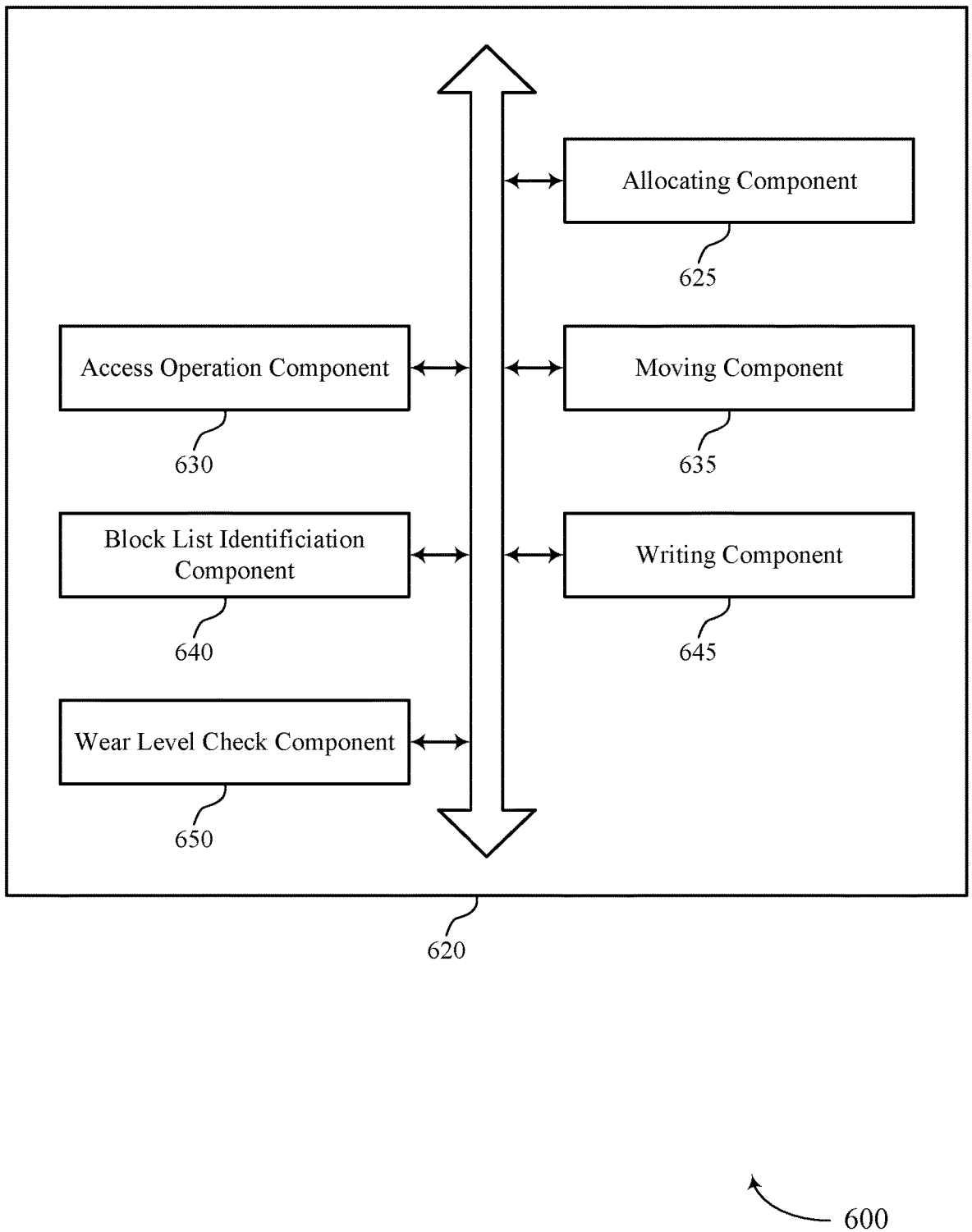
FIG. 6 shows a block diagram of a memory device that supports a sacrificial block pool in accordance with examples as disclosed herein.

FIG. 6 shows a block diagram 600 of a memory device 620 that supports a sacrificial block pool in accordance with examples as disclosed herein. The memory device 620 may be an example of aspects of a memory device as described with reference to FIGS. 1 through 5. The memory device 620, or various components thereof, may be an example of means for performing various aspects of sacrificial block pool as described herein. For example, the memory device

620 may include an allocating component 625, an access operation component 630, a moving component 635, a block list identification component 640, a writing component 645, a wear level check component 650, or any combination thereof. Each of these components may communicate, directly or indirectly, with one another (e.g., via one or more buses).

The allocating component 625 may be configured as or otherwise support a means for allocating, from a plurality of blocks of a memory device, a first pool of blocks and a second pool of blocks, where the first pool of blocks is associated with a first category of access operations in which each memory cell stores a single bit of information, and where the second pool of blocks are associated with the first category of access operations and a second category of access operations in which each memory cell stores a plurality of bits of information. The access operation component 630 may be configured as or otherwise support a means for performing a first set of access operations according to the allocation, where for the first set of access operations a first wear-leveling criteria is applied to a first subset of the second pool of blocks and a second wear-leveling criteria is applied to a second subset of the second pool of blocks. The moving component 635 may be configured as or otherwise support a means for moving at least one block from the second subset of the second pool of blocks to the first pool of blocks based at least in part on an amount of access operations associated with the at least one block satisfying a threshold.

In some examples, the block list identification component 640 may be configured as or otherwise support a means for identifying a list of blocks available for storing a set of data, where the list of blocks includes a first block of the first subset of the second pool of blocks and a second block of the second subset of the second pool of blocks. In some examples, the writing component 645 may be configured as or otherwise support a means for writing the set of data to one or more memory cells associated with the second block based at least in part on the first block being of the first subset of the second pool of blocks.

In some examples, writing the set of data to the one or more memory cells associated with the second block is based at least in part on the writing of the set of data being performed as a result of receiving a write command from a host device.

In some examples, the block list identification component 640 may be configured as or otherwise support a means for determining whether a list of blocks available for storing a set of data excludes each block of the second subset of the second pool of blocks In some examples, the writing component 645 may be configured as or otherwise support a means for writing the set of data to a block of the first subset of the second pool of blocks based at least in part on determining that the list of blocks excludes each block of the second subset of the second pool of blocks.

In some examples, the block list identification component 640 may be configured as or otherwise support a means for identifying a list of blocks available for storing a set of data, where the list of blocks includes a first block of the first subset of the second pool of blocks and a second block of the second subset of the second pool of blocks. In some examples, the writing component 645 may be configured as or otherwise support a means for writing the set of data to the first block based at least in part on the writing of the set of data being performed as a result of a maintenance operation.

In some examples, the wear level check component 650 may be configured as or otherwise support a means for performing a wear level check for a subset of the plurality of blocks excluding the second subset of the second pool of blocks, where the wear level check includes the first wear-leveling criteria.

In some examples, the wear level check component 650 may be configured as or otherwise support a means for determining a maximum change in erase cycles for the subset of the plurality of blocks excluding the second subset of the second pool of blocks, where performing the wear level check is based at least in part on determining the maximum change in erase cycles.

In some examples, the second wear-leveling criteria includes an absence of wear leveling for the second subset of the second pool of blocks.

In some examples, the first subset of the second pool of blocks and the second subset of the second pool of blocks are associated with both the first category of access operations and the second category of access operations.

In some examples, the each memory cell for the first category of access operations and the each memory cell for the second category of access operations include NOT-AND (NAND) memory cells.

Figure 7:
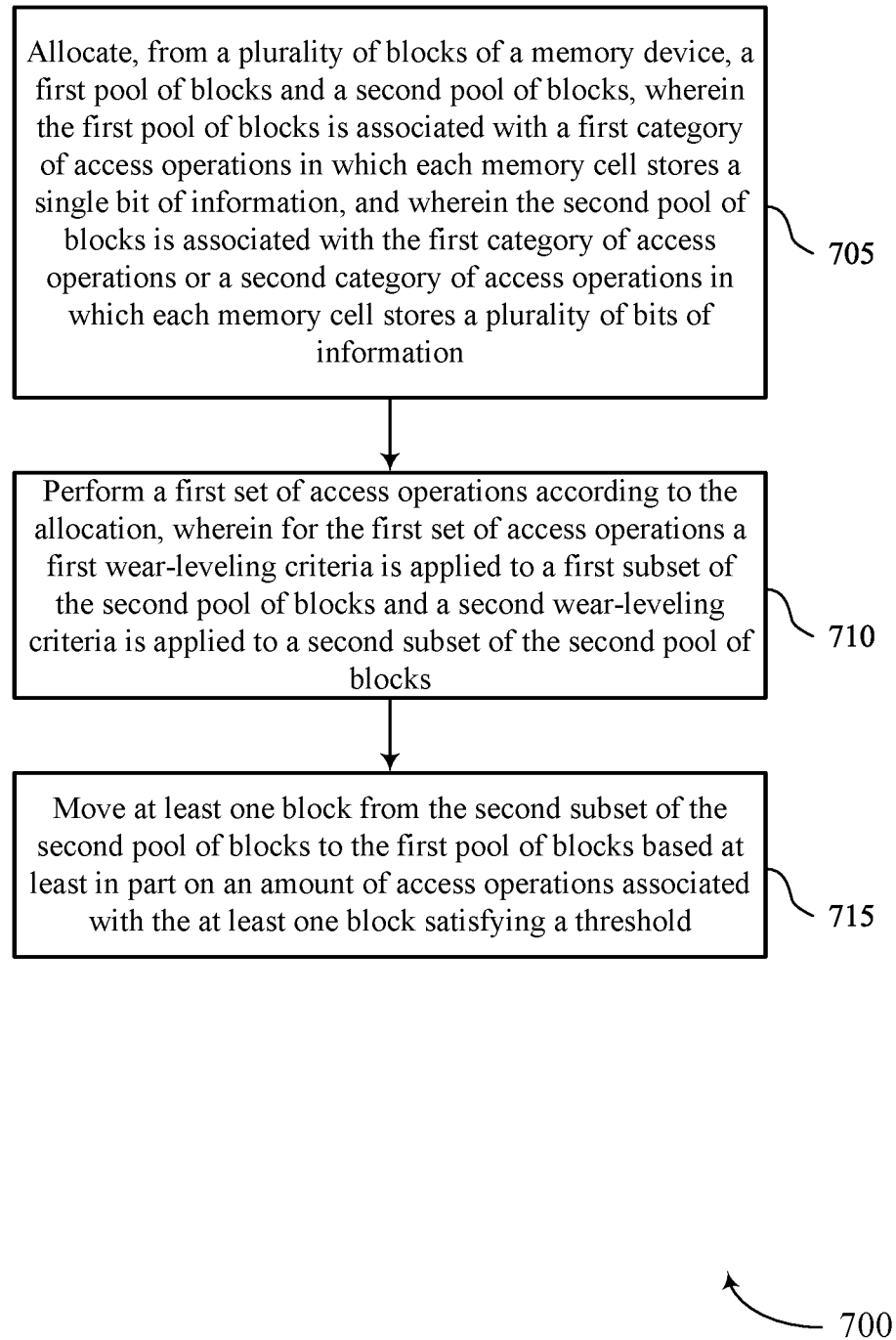
FIG. 7 shows a flowchart illustrating a method or methods that support a sacrificial block pool in accordance with examples as disclosed herein.

FIG. 7 shows a flowchart illustrating a method 700 that supports a sacrificial block pool in accordance with examples as disclosed herein. The operations of method 700 may be implemented by a memory device or its components as described herein. For example, the operations of method 700 may be performed by a memory device as described with reference to FIGS. 1 through 6. In some examples, a memory device may execute a set of instructions to control the functional elements of the device to perform the described functions. Additionally or alternatively, the memory device may perform aspects of the described functions using special-purpose hardware.

At 705, the method may include allocating, from a plurality of blocks of a memory device, a first pool of blocks and a second pool of blocks, wherein the first pool of blocks is associated with a first category of access operations in which each memory cell stores a single bit of information, and wherein the second pool of blocks is associated with the first category of access operations or a second category of access operations in which each memory cell stores a plurality of bits of information. The operations of 705 may be performed in accordance with examples as disclosed herein. In some examples, aspects of the operations of 705 may be performed by an allocating component 625 as described with reference to FIG. 6.

At 710, the method may include performing a first set of access operations according to the allocation, wherein for the first set of access operations a first wear-leveling criteria is applied to a first subset of the second pool of blocks and a second wear-leveling criteria is applied to a second subset of the second pool of blocks. The operations of 710 may be performed in accordance with examples as disclosed herein. In some examples, aspects of the operations of 710 may be performed by an access operation component 630 as described with reference to FIG. 6.

At 715, the method may include moving at least one block from the second subset of the second pool of blocks to the first pool of blocks based at least in part on an amount of access operations associated with the at least one block satisfying a threshold. The operations of 715 may be performed in accordance with examples as disclosed herein. In some examples, aspects of the operations of 715 may be performed by a moving component 635 as described with reference to FIG. 6.

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for allocating, from a plurality of blocks of a memory device, a first pool of blocks and a second pool of blocks, wherein the first pool of blocks is associated with a first category of access operations in which each memory cell stores a single bit of information, and wherein the second pool of blocks is associated with the first category of access operations or a second category of access operations in which each memory cell stores a plurality of bits of information; performing a first set of access operations according to the allocation, wherein for the first set of access operations a first wear-leveling criteria is applied to a first subset of the second pool of blocks and a second wear-leveling criteria is applied to a second subset of the second pool of blocks; and moving at least one block from the second subset of the second pool of blocks to the first pool of blocks based at least in part on an amount of access operations associated with the at least one block satisfying a threshold.

Aspect 2: The method, apparatus, or non-transitory computer-readable medium of aspect 1, further including operations, features, circuitry, logic, means, or instructions, or any combination thereof for identifying a list of blocks available for storing a set of data, wherein the list of blocks comprises a first block of the first subset of the second pool of blocks and a second block of the second subset of the second pool of blocks and writing the set of data to one or more memory cells associated with the second block based at least in part on the first block being of the first subset of the second pool of blocks.

Aspect 3: The method, apparatus, or non-transitory computer-readable medium of aspect 2 where writing the set of data to the one or more memory cells associated with the second block is based at least in part on the writing of the set of data being performed as a result of receiving a write command from a host device.

Aspect 4: The method, apparatus, or non-transitory computer-readable medium of any of aspects 1 through 3, further including operations, features, circuitry, logic, means, or instructions, or any combination thereof for determining whether a list of blocks available for storing a set of data excludes each block of the second subset of the second pool of blocks and writing the set of data to a block of the first subset of the second pool of blocks based at least in part on determining that the list of blocks excludes each block of the second subset of the second pool of blocks.

Aspect 5: The method, apparatus, or non-transitory computer-readable medium of any of aspects 1 through 4, further including operations, features, circuitry, logic, means, or instructions, or any combination thereof for identifying a list of blocks available for storing a set of data, wherein the list of blocks comprises a first block of the first subset of the second pool of blocks and a second block of the second subset of the second pool of blocks and writing the set of data to the first block based at least in part on the writing of the set of data being performed as a result of a maintenance operation.

Aspect 6: The method, apparatus, or non-transitory computer-readable medium of any of aspects 1 through 5, further including operations, features, circuitry, logic, means, or instructions, or any combination thereof for performing a wear level check for a subset of the plurality of blocks excluding the second subset of the second pool of blocks wherein the wear level check comprises the first wear-leveling criteria.

Aspect 7: The method, apparatus, or non-transitory computer-readable medium of aspect 6, further including operations, features, circuitry, logic, means, or instructions, or any combination thereof for determining a maximum change in erase cycles for the subset of the plurality of blocks excluding the second subset of the second pool of blocks, wherein performing the wear level check is based at least in part on determining the maximum change in erase cycles.

Aspect 8: The method, apparatus, or non-transitory computer-readable medium of any of aspects 1 through 7 where the second wear-leveling criteria comprises an absence of wear leveling for the second subset of the second pool of blocks.

Aspect 9: The method, apparatus, or non-transitory computer-readable medium of any of aspects 1 through 8 where the first subset of the second pool of blocks and the second subset of the second pool of blocks are associated with both the first category of access operations and the second category of access operations Aspect 10: The method, apparatus, or non-transitory computer-readable medium of any of aspects 1 through 9 where the each memory cell for the first category of access operations and the each memory cell for the second category of access operations comprise NOT-AND (NAND) memory cells.

It should be noted that the methods described above describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 11: An apparatus, including: a processor; memory coupled with the processor; and instructions stored in the memory and executable by the processor to cause the apparatus to: allocate, from a plurality of blocks of a memory device, a first pool of blocks and a second pool of blocks, wherein the first pool of blocks is associated with a first category of access operations in which each memory cell stores a single bit of information, and wherein the second pool of blocks is associated with the first category of access operations or a second category of access operations in which each memory cell stores a plurality of bits of information; perform a first set of access operations according to the allocation, wherein for the first set of access operations a first wear-leveling criteria is applied to a first subset of the second pool of blocks and a second wear-leveling criteria is applied to a second subset of the second pool of blocks; and move at least one block from the second subset of the second pool of blocks to the first pool of blocks based at least in part on an amount of access operations associated with the at least one block satisfying a threshold.

Aspect 12: The apparatus of aspect 11, where the instructions are further executable by the processor to cause the apparatus to: identify a list of blocks available for storing a set of data, wherein the list of blocks comprises a first block of the first subset of the second pool of blocks and a second block of the second subset of the second pool of blocks; and write the set of data to one or more memory cells associated with the second block based at least in part on the first block being of the first subset of the second pool of blocks.

Aspect 13: The apparatus of aspect 12, where writing the set of data to the one or more memory cells associated with the second block is based at least in part on the writing of the set of data being performed as a result of receiving a write command from a host device.

Aspect 14: The apparatus of any of aspects 11 through 13, where the instructions are further executable by the processor to cause the apparatus to: determine whether a list of blocks available for storing a set of data excludes each block of the second subset of the second pool of blocks; and write the set of data to a block of the first subset of the second pool of blocks based at least in part on determining that the list of blocks excludes each block of the second subset of the second pool of blocks.

Aspect 15: The apparatus of any of aspects 11 through 14, where the instructions are further executable by the processor to cause the apparatus to: identify a list of blocks available for storing a set of data, wherein the list of blocks comprises a first block of the first subset of the second pool of blocks and a second block of the second subset of the second pool of blocks; and write the set of data to the first block based at least in part on the writing of the set of data being performed as a result of a maintenance operation.

Aspect 16: The apparatus of any of aspects 11 through 15, where the instructions are further executable by the processor to cause the apparatus to: perform a wear level check for a subset of the plurality of blocks excluding the second subset of the second pool of blocks wherein the wear level check comprises the first wear-leveling criteria.

Aspect 17: The apparatus of aspect 16, where the instructions are further executable by the processor to cause the apparatus to determine a maximum change in erase cycles for the subset of the plurality of blocks excluding the second subset of the second pool of blocks, wherein performing the wear level check is based at least in part on determining the maximum change in erase cycles.

Aspect 18: The apparatus of any of aspects 11 through 17, where the second wear-leveling criteria comprises an absence of wear leveling for the second subset of the second pool of blocks.

Aspect 19: The apparatus of any of aspects 11 through 18, where the first subset of the second pool of blocks and the second subset of the second pool of blocks are associated with both the first category of access operations and the second category of access operations.

Aspect 20: The apparatus of any of aspects 11 through 19, where the each memory cell for the first category of access operations and the each memory cell for the second category of access operations include NOT-AND (NAND) memory cells.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on (e.g., due to) the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if" "when," "based on," or "based at least in part on" may be used interchangeably. In some examples, if the terms "if" "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent each example that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:
one or more memory devices; and
processing circuitry coupled with the one or more memory devices and configured to cause the memory system to:
allocate, from a plurality of blocks of a memory device of the one or more memory devices, a first pool of blocks and a second pool of blocks, wherein the first pool of blocks stores a single bit of information per cell;
perform a first set of access operations according to the allocation, wherein, for the first set of access operations, a first wear-leveling criteria is applied to a first subset of the second pool of blocks and a second wear-leveling criteria, different than the first wear-leveling criteria, is applied to a second subset of the second pool of blocks, wherein applying the second wear-leveling criteria to the second subset of the second pool comprises refraining from wear-leveling the second subset of the second pool; and
move at least one block from the second subset of the second pool of blocks to the first pool of blocks in accordance with an amount of the first set of access operations associated with the at least one block satisfying a threshold, wherein a third wear-leveling criteria is applied to the at least one block in accordance with moving the at least one block from the second subset of the second pool of blocks to the first pool of blocks, wherein applying the third wear-leveling criteria comprises wear-leveling the first pool of blocks, and wherein, in accordance with the moving, the first pool of blocks is allocated an increased physical memory space and the second subset of the second pool of blocks is allocated a decreased physical memory space.

2. The memory system of claim 1, wherein the processing circuitry is further configured to cause the memory system to:
identify a list of blocks available for storing a set of data, wherein the list of blocks comprises a first block of the first subset of the second pool of blocks and a second block of the second subset of the second pool of blocks; and
write the set of data to one or more memory cells associated with the second block in accordance with the first block being of the first subset of the second pool of blocks.

3. The memory system of claim 2, wherein writing the set of data to the one or more memory cells associated with the second block is in accordance with the writing of the set of data being performed as a result of receiving a write command from a host device.

4. The memory system of claim 1, wherein the processing circuitry is further configured to cause the memory system to:
determine whether a list of blocks available for storing a set of data excludes each block of the second subset of the second pool of blocks; and
write the set of data to a block of the first subset of the second pool of blocks in accordance with determining that the list of blocks excludes each block of the second subset of the second pool of blocks.

5. The memory system of claim 1, wherein the processing circuitry is further configured to cause the memory system to:
identify a list of blocks available for storing a set of data, wherein the list of blocks comprises a first block of the first subset of the second pool of blocks and a second block of the second subset of the second pool of blocks; and
write the set of data to the first block in accordance with the writing of the set of data being performed as a result of a maintenance operation.

6. The memory system of claim 1, wherein the processing circuitry is further configured to cause the memory system to:
perform a wear level check for a subset of the plurality of blocks excluding the second subset of the second pool of blocks wherein the wear level check comprises the first wear-leveling criteria.

7. The memory system of claim 6, wherein the processing circuitry is further configured to cause the memory system to:
determine a maximum change in erase cycles for the subset of the plurality of blocks excluding the second subset of the second pool of blocks, wherein performing the wear level check is in accordance with determining the maximum change in erase cycles.

8. The memory system of claim 1, wherein:
the first wear-leveling criteria comprises an indication that the first subset of the second pool of blocks are to undergo wear-leveling;
the second wear-leveling criteria comprises an indication of an absence of wear leveling for the second subset of the second pool of blocks; and
the at least one block is moved from the second subset of the second pool of blocks based at least in part on the absence of wear leveling for the second subset of the second pool of blocks.

9. The memory system of claim 1, wherein the first subset of the second pool of blocks and the second subset of the second pool of blocks are associated with both a first category of access operations and a second category of access operations.

10. A non-transitory computer-readable medium storing code comprising instructions which, when executed by a processor of an electronic device, cause the electronic device to:
allocate, from a plurality of blocks of a memory device, a first pool of blocks and a second pool of blocks, wherein the first pool of blocks stores a single bit of information per cell;
perform a first set of access operations according to the allocation, wherein, for the first set of access operations, a first wear-leveling criteria is applied to a first subset of the second pool of blocks and a second wear-leveling criteria different than the first wear-leveling criteria is applied to a second subset of the second pool of blocks, wherein applying the second wear-leveling criteria to the second subset of the second pool comprises refraining from wear-leveling the second subset of the second pool; and move at least one block from the second subset of the second pool of blocks to the first pool of blocks in accordance with an amount of the first set of access operations associated with the at least one block satisfying a threshold, wherein a third wear-leveling criteria is applied to the at least one block in accordance with moving the at least one block from the second subset of the second pool of blocks to the first pool of blocks, wherein applying the third wear-leveling criteria comprises wear-leveling the first pool of blocks, and wherein, in accordance with the moving, the first pool of blocks is allocated an increased physical memory space and the second subset of the second pool of blocks is allocated a decreased physical memory space.

11. The non-transitory computer-readable medium of claim 10, wherein the instructions, when executed by the processor of the electronic device, further cause the electronic device to:

identify a list of blocks available for storing a set of data, wherein the list of blocks comprises a first block of the first subset of the second pool of blocks and a second block of the second subset of the second pool of blocks; and write the set of data to one or more memory cells associated with the second block in accordance with the first block being of the first subset of the second pool of blocks.

12. The non-transitory computer-readable medium of claim 11, wherein writing the set of data to the one or more memory cells associated with the second block is in accordance with the writing of the set of data being performed as a result of receiving a write command from a host device.

13. The non-transitory computer-readable medium of claim 10, wherein the instructions, when executed by the processor of the electronic device, further cause the electronic device to:

determine whether a list of blocks available for storing a set of data excludes each block of the second subset of the second pool of blocks; and write the set of data to a block of the first subset of the second pool of blocks in accordance with determining that the list of blocks excludes each block of the second subset of the second pool of blocks.

14. The non-transitory computer-readable medium of claim 10, wherein the instructions, when executed by the processor of the electronic device, further cause the electronic device to:

identify a list of blocks available for storing a set of data, wherein the list of blocks comprises a first block of the first subset of the second pool of blocks and a second block of the second subset of the second pool of blocks; and write the set of data to the first block in accordance with the writing of the set of data being performed as a result of a maintenance operation.

15. The non-transitory computer-readable medium of claim 10, wherein the instructions, when executed by the processor of the electronic device, further cause the electronic device to:

perform a wear level check for a subset of the plurality of blocks excluding the second subset of the second pool of blocks wherein the wear level check comprises the first wear-leveling criteria.

16. The non-transitory computer-readable medium of claim 15, wherein the instructions, when executed by the processor of the electronic device, further cause the electronic device to:

determine a maximum change in erase cycles for the subset of the plurality of blocks excluding the second subset of the second pool of blocks, wherein performing the wear level check is in accordance with determining the maximum change in erase cycles.

17. The non-transitory computer-readable medium of claim 10, wherein:

the first wear-leveling criteria comprises an indication that the first subset of the second pool of blocks are to undergo wear-leveling;

the second wear-leveling criteria comprises an indication of an absence of wear leveling for the second subset of the second pool of blocks; and the at least one block is moved from the second subset based at least in part on the absence of wear leveling for the second subset.

18. The non-transitory computer-readable medium of claim 10, wherein the first subset of the second pool of blocks and the second subset of the second pool of blocks are associated with both a first category of access operations and a second category of access operations.

19. A method at a memory system, comprising:

allocating, from a plurality of blocks of a memory device, a first pool of blocks and a second pool of blocks, wherein the first pool of blocks stores a single bit of information per cell;

performing a first set of access operations according to the allocation, wherein, for the first set of access operations, a first wear-leveling criteria is applied to a first subset of the second pool of blocks and a second wear-leveling criteria different than the first wear-leveling criteria is applied to a second subset of the second pool of blocks, wherein applying the second wear-leveling criteria to the second subset of the second pool comprises refraining from wear-leveling the second subset of the second pool; and moving at least one block from the second subset of the second pool of blocks to the first pool of blocks in accordance with an amount of the first set of access operations associated with the at least one block satisfying a threshold, wherein a third wear-leveling criteria is applied to the at least one block in accordance with moving the at least one block from the second subset of the second pool of blocks to the first pool of blocks, wherein applying the third wear-leveling criteria comprises wear-leveling the first pool of blocks, and wherein, in accordance with the moving, the first pool of blocks is allocated an increased physical memory space and the second subset of the second pool of blocks is allocated a decreased physical memory space.

20. The method of claim 19, further comprising:

identifying a list of blocks available for storing a set of data, wherein the list of blocks comprises a first block of the first subset of the second pool of blocks and a second block of the second subset of the second pool of blocks; and writing the set of data to one or more memory cells associated with the second block in accordance with the first block being of the first subset of the second pool of blocks.

21. The method of claim 20, wherein writing the set of data to the one or more memory cells associated with the second block is in accordance with the writing of the set of data being performed as a result of receiving a write command from a host device.

22. The method of claim 19, further comprising:

determining whether a list of blocks available for storing a set of data excludes each block of the second subset of the second pool of blocks; and writing the set of data to a block of the first subset of the second pool of blocks in accordance with determining that the list of blocks excludes each block of the second subset of the second pool of blocks.

* * * * *